March 4, 1969 — L. P. DOTY — 3,430,621

PORTABLE COOKING GRILL

Filed April 10, 1967

INVENTOR
LEETE P. DOTY
BY Smythe & Moore
ATTORNEYS

United States Patent Office 3,430,621
Patented Mar. 4, 1969

3,430,621
PORTABLE COOKING GRILL
Leete P. Doty, 75 Meeting House Lane,
Fairfield, Conn. 06430
Filed Apr. 10, 1967, Ser. No. 629,628
U.S. Cl. 126—25        4 Claims
Int. Cl. A47j 37/07; F23h 13/06

ABSTRACT OF THE DISCLOSURE

A portable outdoor-type of grill or cooking unit in which an inverted hollow frustum-shaped member having a tiltable grate in the lower portion thereof is air-insulated from an outer casing or housing. The grate may be readily tilted by a hand-operated rod to empty ashes.

---

This invention relates to portable grills adapted to be fired by charcoal and commonly used for outdoor cooking and the like.

While many grills have been proposed for this purpose, there are certain disadvantageous features associated with each of them. A primary object of the present invention, therefore, is to provide an improved cooking grill or burner which eliminates or minimizes the faults of prior grills of the above character.

One of the objects of the present invention is to provide a burner so shaped as to provide natural air draft and rapid production of hot coals.

A further object of the invention is to provide a burner and grill combination which will give maximum heat for a very small quantity of charcoal pellets.

Another object of the invention is to provide a burner and grill combination in which accidental burning of the hands of an attendant and blistering or impairment of the outward appearance of the unit are minimized because of a moving wall of air.

A further object of the invention is to provide a simple, fast, clean and one-handed method of dumping hot coals so that the unit is immediately ready to be put into a car or otherwise stored away.

Another object of the invention is to provide a portable grill of the type above described which will be stable and which may be placed in sand without appreciable tilting.

Still another object of the invention is to provide an efficient grill which may be hand-carried from place to place by one hand.

In one aspect of the invention, an outside substantially cylindrical container or shell contains a conically shaped burner unit or hollow frustum-shaped member having its widest portion at the top of the shell and its narrower lower portion at the bottom of the shell. Air draft spaces are provided between the outer shell and the conical burner unit at both top and bottom to provide cooling air circulation between the shell and cone to increase firing efficiency while minimizing deterioration of outside appearance and hazards to personal injury.

In a second aspect, the grate for containing the charcoals or the like is readily tiltable for disposition of hot ashes or coals upon completion of a cooking operation.

In another aspect, the grate is readily tiltable by a hand-operated rod.

In still another aspect, the grill is substantially entirely constructed of sheet metal so as to be light in weight and readily transportable by a simple bail and handle.

The above and other objects, advantages and features of the invention will become apparent from the following description and drawings which illustrate an exemplary embodiment of the invention.

Figure 1:
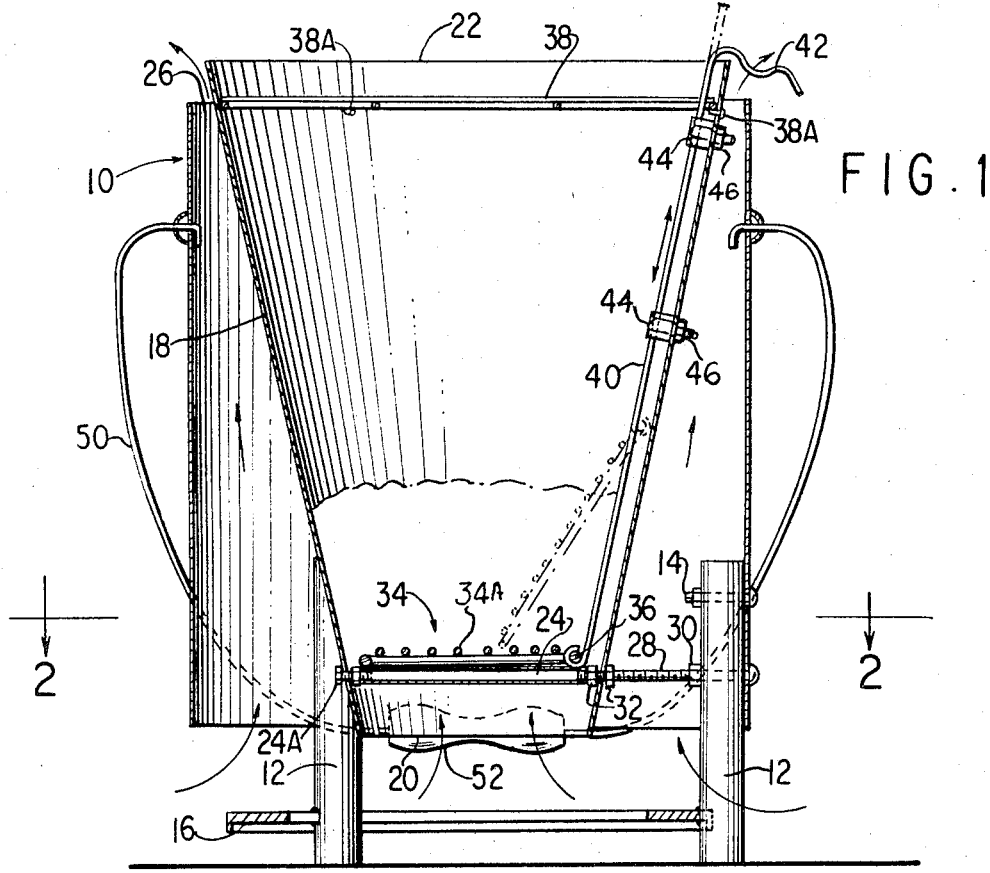
FIG. 1 is a vertical cross sectional view of a grill constructed in accordance with the invention.
Figure 2:
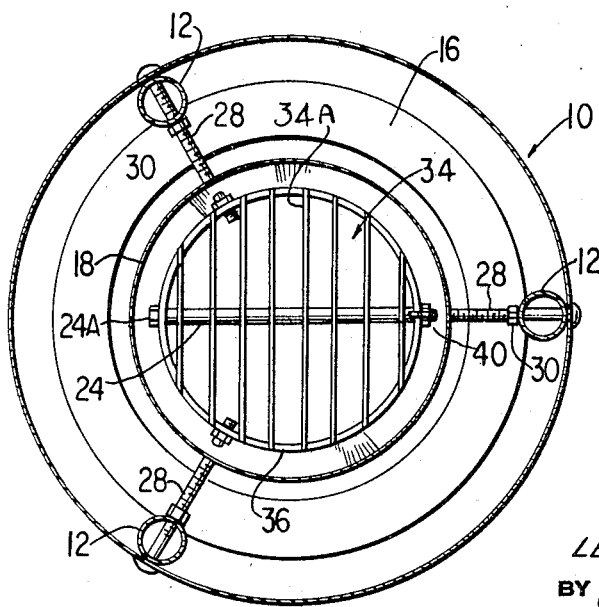
FIG. 2 is a top plan view of the grill of FIG. 1 with the cooking grille removed.
Figure 3:
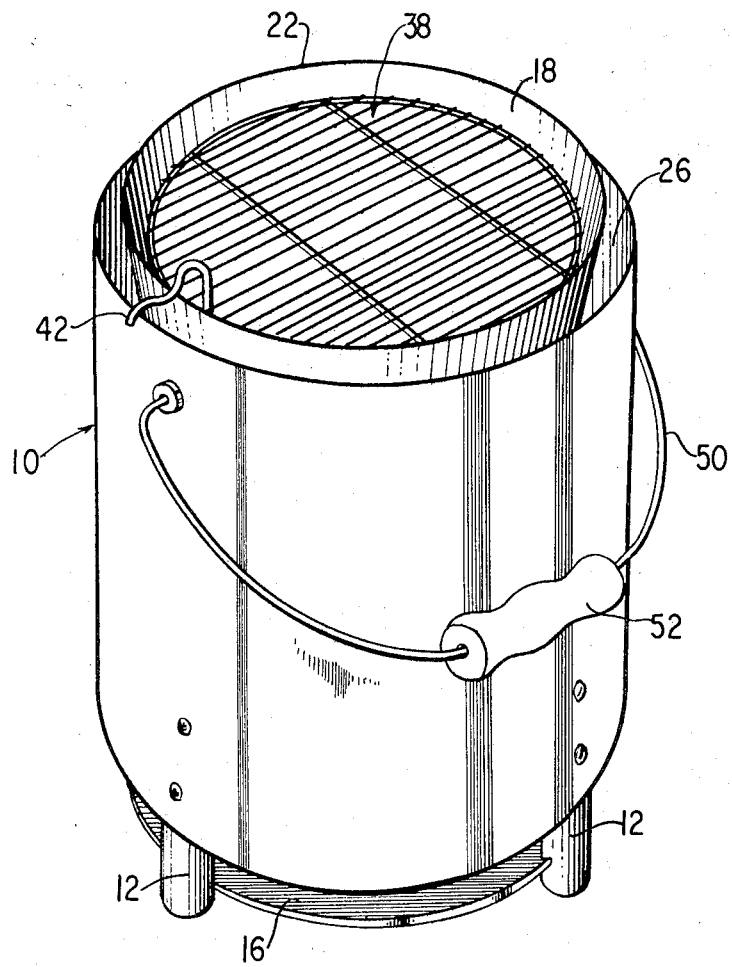
FIG. 3 is a perspective view of embodiment shown in FIG. 1.

Referring to FIG. 1, there is shown an outer casing or housing 10 which may be cylindrical in shape and which has three or more tubular or like legs or supports 12 spaced equidistantly around the casing and secured thereto by bolts or similar fastenings 14. Also detachably attached to the legs 12 by any suitable means adjacent the lower ends thereof is an annular ring or washer-like plate member 16 which serves further to support the legs and prevents excessive sinking of the legs into the ground.

Contained within the housing or casing 10 is an inverted hollow frustum-shaped member 18 of sheet metal having an open lower end 20 and an open upper end 22. Conical member 18 preferably extends slightly above and below casing 10. Elongated bolts 28 extend laterally of the casing 10 adjacent its lower end and support the conical member 18 within casing 10. As shown in FIG. 1, bolts 28 preferably extend through the legs or supports 12 to give rigidity and are clamped in position on the legs by nuts 30. Additional nuts 32 secure the conical member 18 to the bolts 28.

The inner end of one of the bolts 28 is threaded into or is fitted into the end of tube 24. Tube 24 extends across and adjacent to the bottom of conical member 18, the opposite end of tube 24 being held by the end of bolt 24A extending therein. The ends of the other bolts 28 extend in sufficiently far so as to support the grate 34.

Positioned in the lower part of the conical member 18 and normally resting on the internally extending ends of bolts 28 is a grate member 34 for supporting charcoal pellets or the like and consisting of an outer ring 36 and cross rods 34A welded or otherwise secured thereto. Pivotally attached to the ring 36 of grate 34 is an operating rod 40 which extends upwardly along the inner wall of the conical member 18 and terminates in a finger or hand engaging portion 42. The rod 40 is guided upwardly within the conical member 18 by one or more headed bolts 44, the heads of which have a hole providing for free movement of the rod 40 therethrough and being secured by nuts 46.

The purpose of operating rod 40 is to tilt the grate 34 in an upward direction as indicated by the dashed lines in FIG. 1 to dump the ashes on the grate in a clean and simple manner. Tube 24 will assist in the return of the grate to its normal position. Suitable lugs or the like (not shown) may also be provided on the casing 18 for preventing lateral tipping of the grate 34.

The top 22 of the conical member 18 is adapted to receive any of the usual types of elements or units for broiling, barbecuing or cooking of meats and other foods, such as a simple grillework of interconnected rods or bars. Bolts 38A may be placed at spaced points around the periphery of the frustum member so as to support the grille 38.

One of the features of the invention is that the portable grill is light in weight and readily transportable. For this latter purpose, a simple bail 50 having a handle 52 of wood may be provided.

Another feature of the invention, as above mentioned, is that it affords efficient burning while maintaining the outer casing or housing free from excessive heat which might endanger a user or impair the external finish. This is accomplished by the inverted frustum shape of the member 18 and the space 26 at the top of the casing or housing 10 which provides for free circulation of cooling air. Also, the conical burner member 18 extends slightly above and below the outer casing or shell 10.

As an example of a grill or cooking unit in accordance with the present invention, the outer casing or housing 10 may have a diameter of 11.25 inches and a depth of 12.5 inches. The frustum-shaped member 18 may have a lower diameter of 4.75 inches, an upper diameter of 10.75 inches, and may extend approximately .25 inch below and .75 inch above the casing or housing 10.

It will be understood, however, that the above dimensions and the disclosed embodiment of the invention are merely illustrative and exemplary, and that changes, alterations and modifications may be made without departing from the spirit of the invention, except as defined in the appended claims.

What is claimed is:

1. A portable cooking unit of the outdoor type comprising an outer casing, an inverted hollow frustum-shaped member contained within said outer casing, tiltable grate means positioned within the lower end of said frustum-shaped member, and means for supporting said frustum-shaped member within said casing, said supporting means providing a space between said frustum-shaped member and the top of said casing for the circulation of cooling air, said grate being tiltable by a rod-like member extending upwardly along the wall of said frustum-shaped member.

2. The cooking unit of claim 1 wherein said rod-like member has guide means therefor on the wall of the frustum-shaped member.

3. The cooking unit of claim 1 wherein the lower end of said frustum-shaped member is supported by a bolt-like member extending transversely of said outer casing and said tiltable grate normally rests upon said bolt-like member.

4. A portable cooking unit of the outdoor type comprising an outer casing, an inverted hollow frustum-shaped member contained within said outer casing, said frustum-shaped member extending slightly above the outer casing, a tiltable grate positioned in the lower end of said frustum-shaped member, means for supporting said frustum-shaped member within said outer casing, said supporting means generally horizontally supporting said grate, said supporting means providing a space between said casing and said frustum-shaped member at the upper and lower ends of the casing to provide for circulation of cooling air, and a removable cooking grill composed of a ring and bars supportable adjacent the top of the said frustum-shaped member, and a rod-like member extending upwardly of said frustum-shaped member, said rod-like member being pivoted at its lower end to and for tilting said grate.

References Cited

UNITED STATES PATENTS

| 246,561 | 8/1881 | Sassinot et al. | 126—25 |
| 2,094,915 | 10/1937 | Dawson | 126—25 |
| 2,161,669 | 6/1939 | Freeman | 126—25 |
| 2,501,381 | 3/1950 | Doblin | 126—25 |
| 3,167,040 | 1/1965 | Byars et al. | |

FREDERICK KETTERER, Primary Examiner.

U.S. Cl. X.R.

126—162